United States Patent
Dipper et al.

(10) Patent No.: US 8,650,181 B2
(45) Date of Patent: Feb. 11, 2014

(54) OLAP EXECUTION MODEL USING RELATIONAL OPERATIONS

(75) Inventors: Stefan Dipper, Wiesloch (DE); Erich Marschall, Nussloch (DE); Tobias Mindnich, Walldorf (DE); Daniel Baeumges, Lindenallee (DE); Christoph Weyerhaeuser, Heidelberg (DE)

(73) Assignee: SAP AG, Walldorf (DE)

( * ) Notice: Subject to any disclaimer, the term of this patent is extended or adjusted under 35 U.S.C. 154(b) by 314 days.

(21) Appl. No.: 12/951,948

(22) Filed: Nov. 22, 2010

(65) Prior Publication Data

US 2012/0130942 A1    May 24, 2012

(51) Int. Cl.
G06F 7/00    (2006.01)

(52) U.S. Cl.
USPC ............................ 707/714; 707/717; 707/798

(58) Field of Classification Search
None
See application file for complete search history.

(56) References Cited

U.S. PATENT DOCUMENTS

| 6,275,818 B1 * | 8/2001 | Subramanian et al. ............... 1/1 |
| 7,089,266 B2 * | 8/2006 | Stolte et al. ................... 707/769 |
| 2007/0073658 A1 | 3/2007 | Faerber et al. |

OTHER PUBLICATIONS

U.S. Appl. No. 12/914,445, filed Oct. 28, 2010, Christoph Weyerhaeuser et al.

* cited by examiner

*Primary Examiner* — Paul Kim
(74) *Attorney, Agent, or Firm* — Fountainhead Law Group PC

(57) ABSTRACT

In one embodiment the present invention includes an OLAP execution model using relational operations. In one embodiment, the present invention includes, a method comprising receiving a first query in an online analytic processor (OLAP) executing on one or more computers, the OLAP generating and comprising a model specifying a graph defining a plurality of nodes and a plurality of tiers, each node corresponding to a different operation on data. A second query is generated by the OLAP. The second query includes a plurality of layered subqueries each corresponding to one of the nodes in the graph for specifying the different operations on data. The second query is received in a relational engine coupled to the datastore. The relational engine executes the second query, and in accordance therewith, retrieves data.

14 Claims, 6 Drawing Sheets

OLAP EXECUTION MODEL USING RELATIONAL OPERATIONS

BACKGROUND

The present invention relates to computing and data processing, and in particular, to on-line analytic processing execution model using relational operations.

Unless otherwise indicated herein, the approaches described in this section are not prior art to the claims in this application and are not admitted to be prior art by inclusion in this section.

FIG. 1 shows a conventional data storage and analysis platform. Computer system 101 may include a data warehousing component 102 to store large volumes of historical data about an enterprise, for example. Data warehouse 102 may include loading (staging) components, format conversion components, and/or data consistency components, for example. Data warehouse 102 may load data into a datastore 105 through a relational engine 103. Datastore 105 may include one or more database and/or database management components. In a data warehousing application, as well as other data storage applications, data is stored as a star schema 106. A star schema stores data in one or more fact tables and multiple dimension tables.

Users may ask questions that are answerable using the stored data by submitting queries. Typically, queries are submitted to an on-line analytics processing component (OLAP) 107 executing on computer system 101. OLAP 107 may receive a query, such as a business question, and communicate with relational engine 103 to obtain the data necessary for answering the query. Some OLAP engines retrieve granular data from datastore 103 using a single query to relational engine 103 and cache or otherwise store large volumes of data locally to generate answers to OLAP queries. One disadvantage to this approach is that large volumes of data must be retrieved and updated regularly to maintain the accuracy of the OLAP query results. Other OLAP engines query cells in the datastore separately and at a granular level based on the input OLAP query. One disadvantage of this approach is the complexity required to generate granular queries and combine the results in the OLAP engine. Another disadvantage with this approach is that for complex user questions the number of cells can get very high and therefore the overall response time becomes very bad.

Thus, there is a need for improved technique for responding to OLAP queries. The present invention solves these and other problems by providing an OLAP execution model using relational operations.

SUMMARY

Embodiments of the present invention improve queries in systems using OLAP. In one embodiment, the present invention includes a method comprising receiving a first query in an online analytic processor (OLAP) executing on one or more computers, generating a model, the model specifying a graph defining a plurality of nodes and a plurality of tiers, each node corresponding to a different operation on data, generating a second query based on the model, the second query including a plurality of layered subqueries each corresponding to one of the nodes in the graph for specifying the different operations on the data, and receiving the second query in a relational engine coupled to a datastore, wherein the relational engine executes the second query, and in accordance therewith, retrieves data.

In one embodiment, a first node on a highest tier in the model corresponds to a subquery comprising an exception aggregation, the exception aggregation associating a first aggregation type with a first measure and a first dimension of a dimension table, the first aggregation type being different than a default aggregation type used on the first measure when aggregating said first measure across other dimensions, wherein the second query comprises at least one SQL statement corresponding to a second node on a tier below the highest tier nested in a SQL statement corresponding to the first query.

In one embodiment, the OLAP generates and comprises said model, and wherein the second query is generated by said OLAP.

In one embodiment, the plurality of nodes correspond to successive operations on the data in the database performed by the relational engine.

In one embodiment, the plurality of nodes of said graph comprise a first node on a first tier corresponding to first data, wherein the first data is all the data required to answer the first query, the first node having a corresponding first subquery for retrieving the first data, and a plurality second nodes on a plurality of tiers above the first tier, each second node corresponding to a different operation on the first data.

In one embodiment, the plurality of nodes includes a root node, a plurality of second tier nodes, and one or more higher tier nodes, wherein the root node has a corresponding first subquery to operate on raw data in the database to produce first data required to answer the first query, wherein the plurality of second tier nodes are coupled to the root node in the graph and each have corresponding subqueries that operate on the first data, and wherein at least one of the second tier nodes is coupled to the one or more higher tier nodes, wherein each higher tier node has a corresponding subquery for operating on data generated by the subquery of the at least one second tier node.

In one embodiment, the datastore is a database, and wherein the data is stored in the database in at least one fact table and a plurality of dimension tables.

In one embodiment, the second query is a nested SQL statement.

In one embodiment, each subquery comprises a SQL statement. For example, each subquery may be a database view containing a SQL statement.

In one embodiment, a portion of the nodes of the graph are represented by subqueries executed in the relational engine and one or more of the nodes in the graph correspond to data operations executed by said OLAP.

In one embodiment, the method further comprises returning said retrieved data from the relational engine to the OLAP, processing the retrieved data in the OLAP based on said one or more nodes in the graph corresponding to data operations executed by said OLAP, and returning a result to said first query.

In one embodiment, the graph specifies an execution plan where operations corresponding to lower tier nodes are performed on data before operations corresponding to higher tier nodes and wherein data resulting from an operation corresponding to a first node on a lower tier is operated on by a second higher tier node directly connected to the first node in the graph.

In one embodiment, the present invention includes a system comprising one or more computers, a database, an online analytic processor (OLAP), executing on the one or more computers, to receive a first query, a model, the model specifying a graph defining a plurality of nodes on a plurality of tiers, each node corresponding to a different operation on data, and a relational engine coupled to a datastore to receive the second query, where the relational engine executes a second query, and in accordance therewith, retrieves data. The OLAP generates the second query based on the model, the second query including a plurality of layered subqueries each corresponding to one of the nodes in the graph for specifying the different operations on data.

In another embodiment, the present invention includes non-transitory computer readable storage medium embodying a computer program for performing a method, said method comprising receiving a first query in an online analytic processor (OLAP) executing on one or more computers, generating a model, the model specifying a graph defining a plurality of nodes and a plurality of tiers, each node corresponding to a different operation on data, generating a second query based on the model, the second query including a plurality of layered subqueries each corresponding to one of the nodes in the graph for specifying the different operations on the data, and receiving the second query in a relational engine coupled to a datastore, wherein the relational engine executes the second query, and in accordance therewith, retrieves data.

The following detailed description and accompanying drawings provide a better understanding of the nature and advantages of the present invention.

DETAILED DESCRIPTION

Described herein are techniques for an OLAP execution model using relational operations. The apparatuses, methods, and techniques described below may be implemented as a computer program (software) executing on one or more computers. The computer program may further be stored on a computer readable medium. The computer readable medium may include instructions for performing the processes described below. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
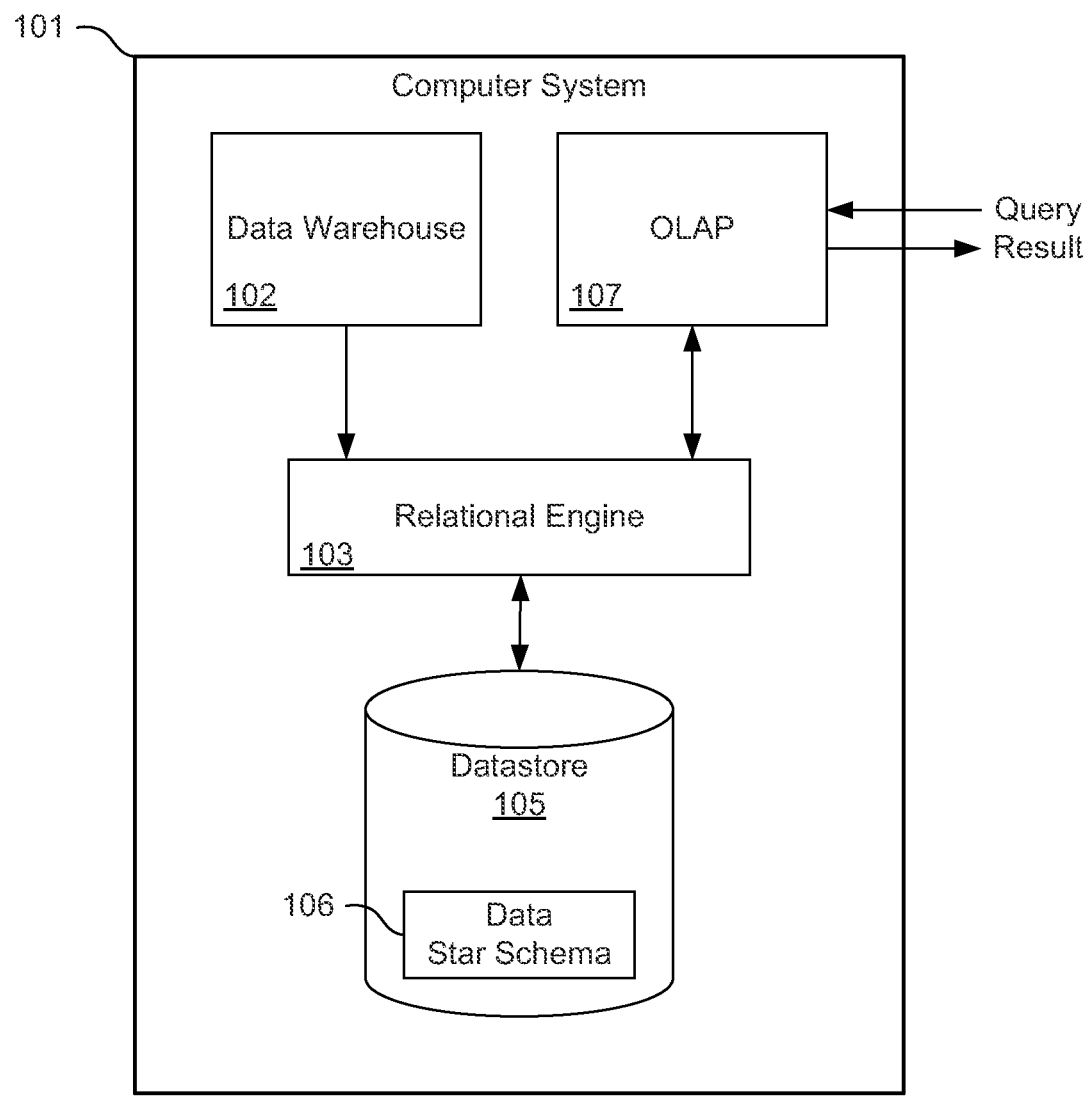
FIG. 1 shows a conventional data storage and analysis platform.
Figure 2:
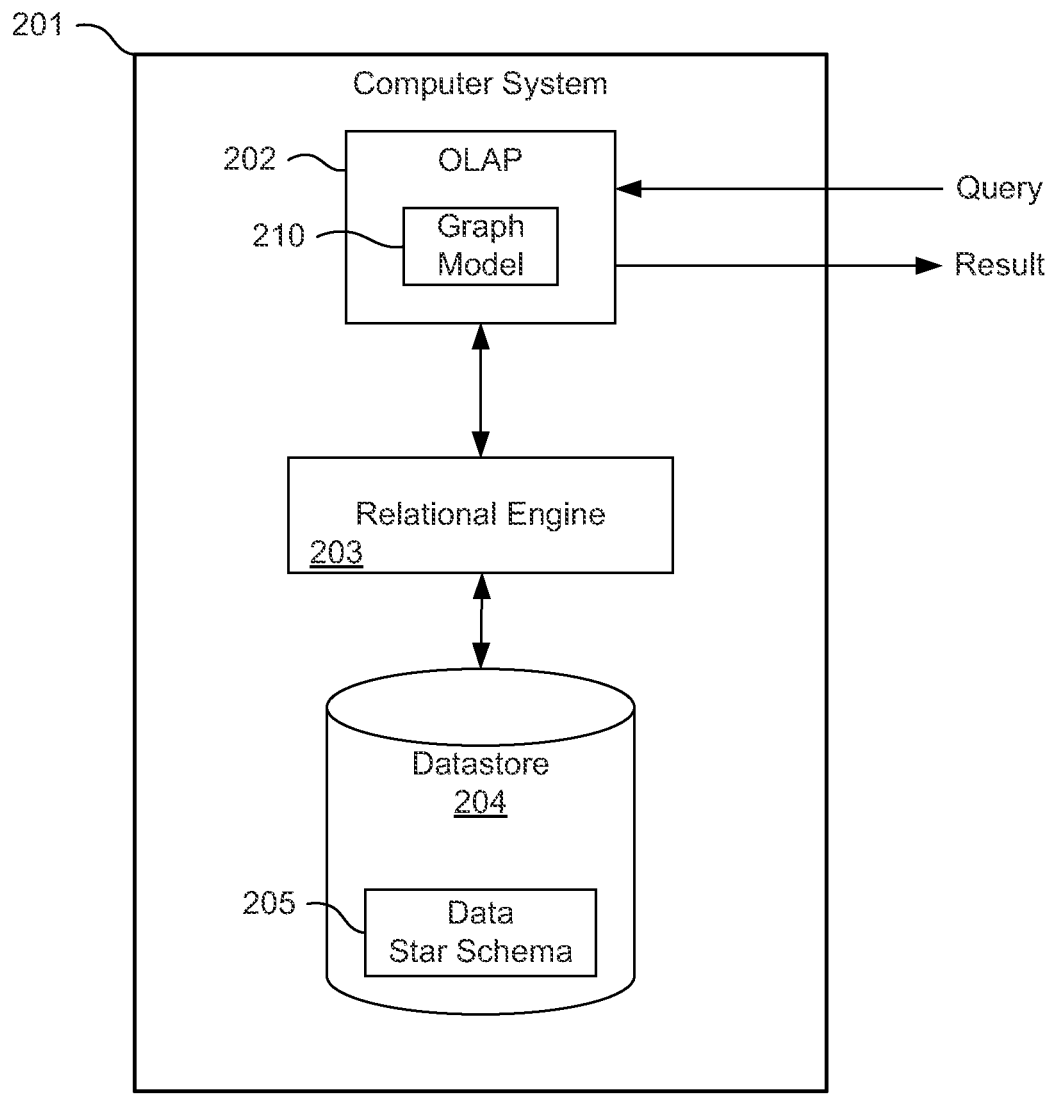
FIG. 2 illustrates a system using an OLAP execution model according to one embodiment of the present invention.

FIG. 2 illustrates system using an OLAP execution model according to one embodiment of the present invention. Computer system 201 includes an on-line analytic processor (OLAP) 202, relational engine 203, and data store 204. Computer system 201 may include one or more computers that each may have one or more microprocessor and memory, for example. The term computer system includes a single computer, multiple computers, one or more client computers, one or more server computers, or portable computing devices, for example. OLAP 202, relational engine 203, and data store 204 may be implemented in software and executed on computer system 201. OLAP 202, relational engine 203, and data store 204 may be executed on the same computer or on different computing devices (e.g., in a distributed system). Datastore 204 may include one or more databases that may include database management systems and may or may not include dedicated hardware. Datastore 204 may include an in-memory database and/or a database implemented on one or more hard disk drives or other storage devices, for example.

OLAP 202 receives a query. The query may specify quantitative questions that are answerable using data in data store 204. For example, the query may specify data fields that are capable of being derived from the raw data in data store 204. Upon receipt of the query, OLAP 202 interacts with relational engine 203 to retrieve data from data store 204 to generate results. In this example, data in data store 204 is stored as a multidimensional model, such as a star schema. Star schema 205 stores data in at least one fact table and a plurality of dimension tables. Generally, data in data store 204 is stored in relational tables that are accessed by relational engine 203. Relational engine may be optimized for retrieving data from relational tables, for example.

Features and advantages of the present invention include a model specifying a graph 210. The model may be represented in a computer using a variety of programming techniques, such as metadata or an object model, for example. Graph model 210 (herein, "graph" or "model") specifies successive operations of data from relational database 203 for answering the OLAP query. Graph 210 defines a plurality of nodes and a plurality of tiers. Each node in graph 210 corresponds to a different operations on data stored in a database, for example. As described in more detail below, each node corresponds to a subquery. Since the nodes are layered in tiers, the subqueries are correspondingly layered so that the nodes in the model define successive operations on the raw data in the data store 204. Graph 210 may specify an execution plan, for example, where operations corresponding to lower tier nodes are performed on data before operations corresponding to higher tier nodes, and where data resulting from an operation corresponding to a first node on a lower tier is operated on by a second higher tier node directly connected to the first node in the graph. Accordingly, graph 210 provides an execution model for translating the OLAP query into subqueries that can be optimized by a relational engine 203 to improve the efficiency of retrieving the data needed to answer the OLAP query. While graph 210 is illustrated here as residing in OLAP 202, it is to be understood that the graph may reside in relational engine 203 or between OLAP 202 and relational engine 203, for example. Techniques that may be useful in connection with generating graph model 210, for example, are disclosed in U.S. patent application Ser. No. 12/914,445 to Christoph Weyerhaeuser et al., entitled Database Calculation Engine, the entire disclosure of which is hereby incorporated herein by reference.

Once the query is received by OLAP 202, the graph model 210 is generated. In this example, a second query is generated by OLAP 202 based on graph model 210 and sent to relational engine 203. The second query may include a plurality of layered subqueries. The second query may comprise SQL statements or, for example, a nested SQL statement corresponding to the graph as described herein. Each layered subquery corresponds to one of the nodes in the graph for specifying the different subsets of data stored in the database. The second query is received in and executed by relational engine 203. Relational engine 203 retrieves data specified by the second query and returns the data to OLAP 202. OLAP 202 returns a result in response to the OLAP query using the data returned by the second query.

Figure 3A:
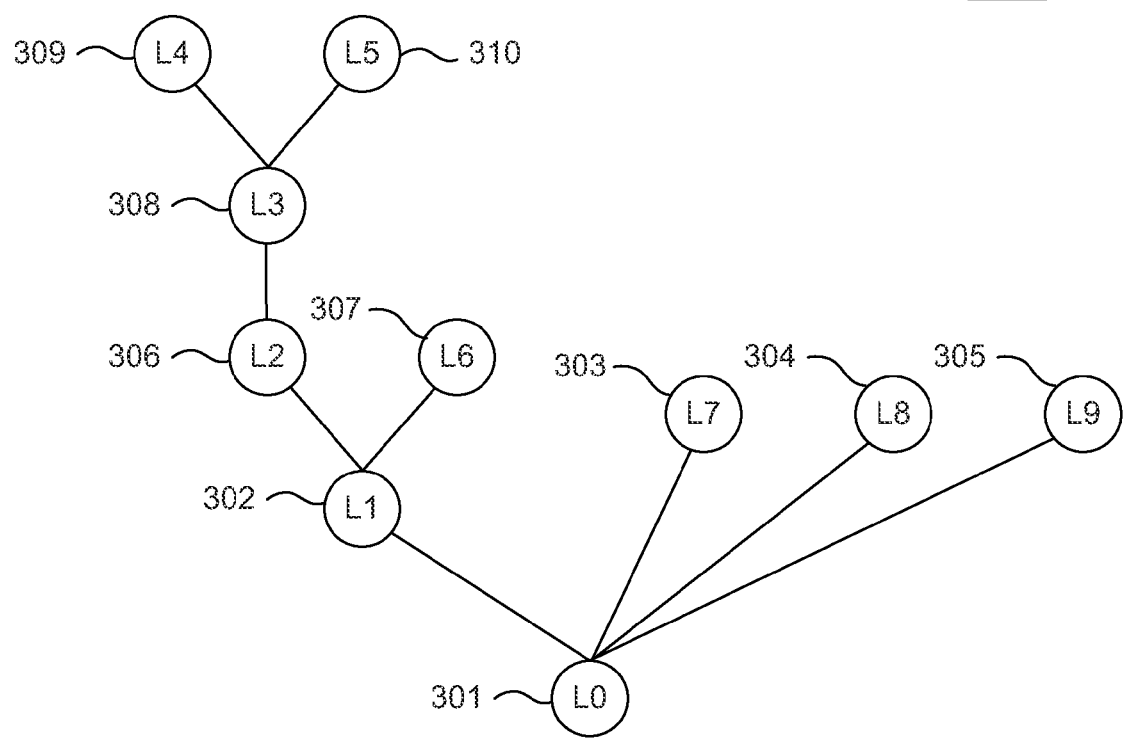
FIG. 3A is an example graph to illustrate one embodiment of the present invention.

FIG. 3A illustrates an example graph according to one embodiment of the present invention. Graph 300 includes nodes 301-310 (L0-L9) coupled together in layered tiers. Node L0 is the lowest tier or "root node." The lowest tier may have only a single root node L0, for example. Node L0 represents all the needed data from a relational database to answer any OLAP query that uses the graph model. L0 may correspond to required data in its most granular form in a relational table in a database, for example, such as a single receipt from a transaction including a transaction ID, store name, customer, and price. L0 corresponds to a relational database query to retrieve all the data needed to answer one or more OLAP queries, for example. Graph 300 includes a second tier of nodes 302-303 (L1, L7-L8) directly coupled to node L0. Each node L1, L7-L8 may represent a further refinement (e.g., a subset or aggregation) of the data represented by L0. Data may be selected, aggregated, or otherwise operated on (i.e., transformed) across different nodes in the graph. For example, L1 may correspond to a transformation of data from L0. Accordingly, L1 may have a corresponding query that selects and/or processes data from the data generated by the L0 query. L7 may correspond to a different transformation of data from L0. Accordingly, L7 may have another corresponding query that selects and/or processes data from the data generated by the L0 query. L8 and L9 may similarly have different corresponding queries that select and/or process the data from the L0 query.

In this example, graph 300 further includes a third tier of nodes at 306-307 (L2 and L6). L2 and L6 may further refine the data selected by the L1 query. For example, L2 may correspond to an operation on data from L1. Accordingly, L2 may have a corresponding query that processes data from the data generated by the L1 query. Similarly, L6 may correspond to a different operation on data from L1. Accordingly, L6 may have a corresponding query that processes data from the data generated by the L1 query. Further refinements on data represented by L2 may be made at forth tier node 308 (L3) and two fifth tier nodes 309-310 (L4-L5).

Figure 3B:
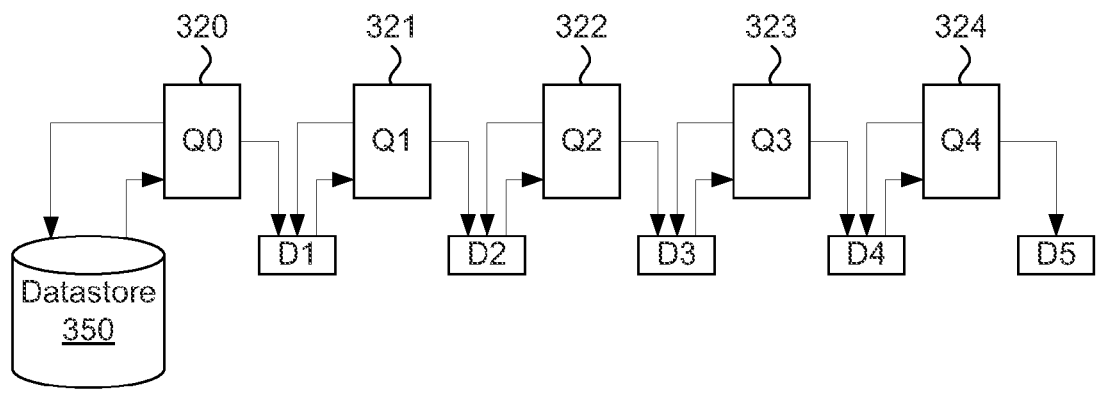
FIG. 3B shows successive data processing represented by the example graph in FIG. 3A to illustrate an embodiment of the present invention.

FIG. 3B illustrates successive data processing represented by the example graph in FIG. 3A. In this illustrative diagram, queries 320-324 (Q0-Q4) correspond to nodes L0-L4. Graph 300 corresponds to multiple layered (or successive) queries on datastore 350. For example, nodes L0-L4 correspond to queries Q0-Q4, respectively. L0 corresponds to Q0 producing data D1, which is a subset of all data store 350. L1 corresponds to Q1 producing data D2, which results from operating on data D1. Similarly, L2 corresponds to Q2 producing data D3, which results from operating on data D2. Likewise, L3 corresponds to Q3 producing data D4, which results from operating on data D3. Finally, L4 corresponds to Q4 producing data D5, which results from operating on data D4. Each of the nodes may have corresponding queries that retrieve data for answering a portion of the OLAP query. Accordingly, the desired OLAP query results are, in a sense, modeled in graph 300 so that the data required to answer the OLAP query may be retrieved more efficiently. It is to be understood that a particular graph may correspond to a single OLAP query or multiple OLAP queries.

Figure 4:
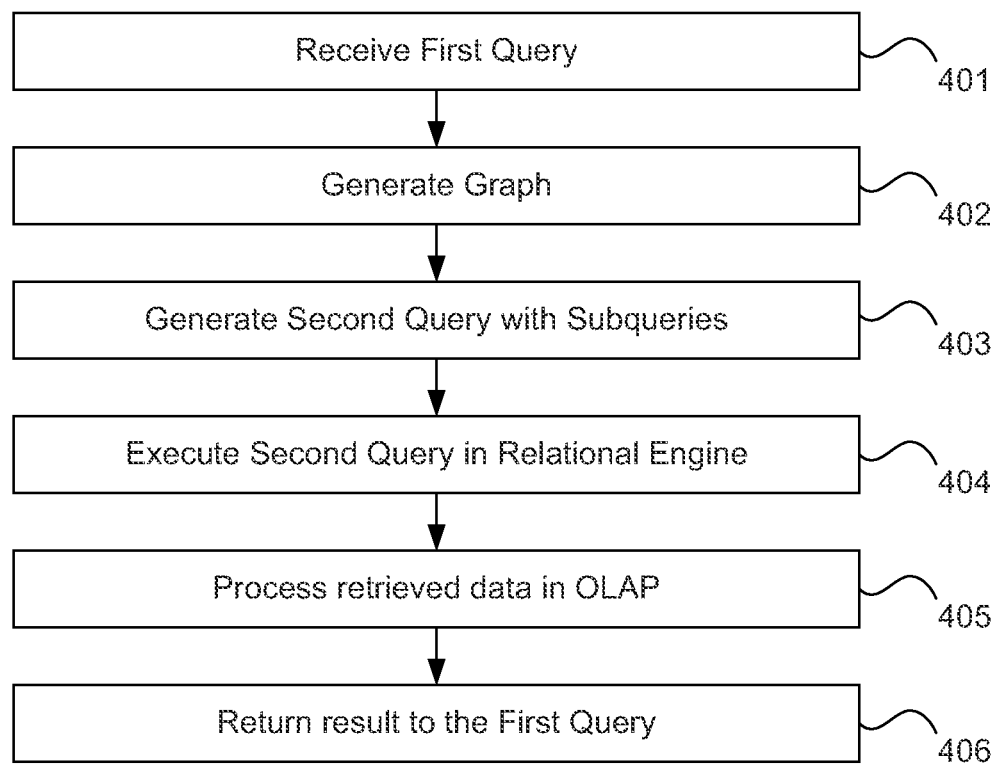
FIG. 4 illustrates a method according to one embodiment of the present invention.

FIG. 4 illustrates a method according to one embodiment of the present invention. At 401, a first query is received in an OLAP software component executing on a computer system. In this example, the OLAP generates a model specifying a graph defining a plurality of nodes and a plurality of tiers. Each node corresponds to a different operation on data. At 402, the graph is generated by the OLAP. At 403, a second query is generated by the OLAP based on the model. The second query may include a plurality of layered subqueries each corresponding to one of the nodes in the graph for specifying the different operations on data. In some applications, all the nodes in the graph may have corresponding subqueries that are processed by a relational engine. However, in other embodiments only a portion of the nodes of the graph are represented by subqueries executed in the relational engine, and one or more of the nodes in the graph correspond to data operations executed by the OLAP. At 404, the second query is executed in a relational engine coupled to a database. Data in the database is accessed according to the second query and subqueries and retrieved. Data is returned from the relational engine to the OLAP. Alternatively, database views (e.g., database views containing SQL statements) may be stored inside the relational engine and then queries may be executed against the database views to retrieve the data. At 407, the OLAP may further process the returned data. For example, the OLAP may format the data or the OLAP may further operate on the data based on nodes in the graph that are performed in the OLAP, for example. At 408, the OLAP returns a result to the first query.

In one embodiment, the model separates the application problem (e.g., the OLAP problem) from the technical expression of the execution. Of course, a variety of optimizations in the graph may be implemented based on the application using relational database optimization techniques. In the above example, layers may be combined using grouping sets. Another example is that filters in upper layers can be pushed down to lower layers. Not necessarily all layers within the graph need to be pushed down to a relational processing engine. In some implementations, some layers inside the graph are processed by the OLAP engine itself. All data that is not within the reach of the relational engine (e.g. data from remote data accesses etc. . . . ) may be temporarily placed into a workspace of the relational engine using temporary tables. Accordingly, some implementations may include data from other sources into the processing graph.

EXAMPLES

Features of the present invention include an execution model that hands over not only the retrieval of the data from a multi-dimensional model, but also OLAP processing of data retrieved from a database to a relational engine. The model allows translation of the OLAP problem into a relational problem, and therefore works as an interface between the OLAP engine and a relational engine.

The result set from a multi-dimensional model can be considered as a set of rows or table. Nearly all operations necessary to execute OLAP functionality can be expressed in a layer model of nodes on multiple tiers, where each layer (a node at a particular tier) can be looked at like a relational view of data. Layers can depend on each other, and other relational data also can contribute to a higher layer. The layer the multi-dimensional data is retrieved in to map to the most granular data contained in a query definition is named layer 0 (L0).

Each layer, like a SQL view, may comprise a set of columns that can be derived from deeper layers by Projection, Formulas (including fixed values), Aggregation and Grouping, Joining deeper layers and other relational data, Filtering on deeper layers, or Sorting data for example. The SQL Having clause may be expressed as two layers, where the having is a filter on columns of the higher layer that are derived by projection from aggregated columns of the lower layer. The order of execution of formulas and aggregation can be defined as in the SQL standard.

A subquery identifier that indicates that a row in the result set of layer 0 is part of a subquery result can be treated like a normal column inside the model. It can be used for filtering and projection, for example, in particular embodiments. A subquery identifier is illustrated in U.S. Patent Publication No. US 2007/0073658 A1 published on Mar. 29, 2007, entitled Efficient Handling of Multipart Queries Against Relational Data, the entire disclosure of which is incorporated herein by reference for all purposes.

Table 1 shows an example OLAP query result.

TABLE 1

| Country | Material | #Customers | Quantity |
|---|---|---|---|
| DE | 0001 | 5 | 10 |
|  | 0003 | 3 | 5 |
|  | Total | 6 | 15 |
| US | 0001 | 3 | 7 |
|  | 0002 | 5 | 11 |
|  | Total | 7 | 18 |
| Total |  | 11 | 33 |

Shown are the dimensions Country, Material and the measure Quantity with aggregation SUM, and a calculated measure #Customers. #Customers is calculated as the distinct number of customers per combination of County and Material. #Customers does not stick to aggregation SUM, as the same customers that has bought Material 0001 in Country DE might also have bought Material 0003 in country DE. It is not necessary to distinguish between dimensions and measures in the model because there are situations where, for example, formulas also apply to dimensions, and aggregation operations, such as COUNT DISTINCT, are possible on columns that are projections of former dimensions.

Figure 5:
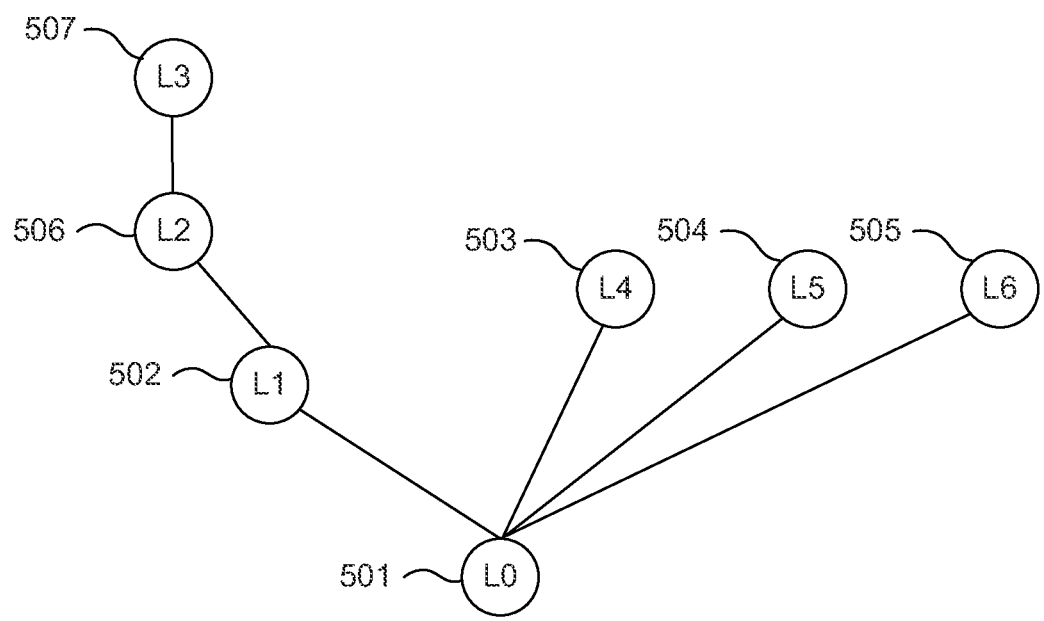
FIG. 5 is another example graph to illustrate an embodiment of the present invention.

The above query may be translated into the relation execution model as follows and as illustrated in FIG. 5.

Layer 0 (e.g., the root node) at 501 is the layer that retrieves all needed data from the multidimensional model. Layer 0 can be expressed as a SQL VIEW:
CREATE VIEW L0 AS SELECT COUNTRY, MATERIAL, CUSTOMER, SUM(QUANTITY) "QUANTITY" FROM . . . .
GROUP BY COUNTRY, MATERIAL, CUSTOMER Layer 1 at 502 retrieves the quantities per country and material from layer 0:
CREATE VIEW L1 AS SELECT COUNTRY, MATERIAL, SUM(QUANTITY) "QUANTITY" FROM L0 GROUP BY COUNTRY, MATERIAL Layer 2 at 506 retrieves the quantities per country from layer 1:
CREATE VIEW L2 AS SELECT COUNTRY, SUM(QUANTITY) "QUANTITY" FROM L1 GROUP BY COUNTRY Layer 3 at 507 retrieves the total quantities from layer 2:
CREATE VIEW L3 AS SELECT SUM(QUANTITY) "QUANTITY" FROM L2

Layer 4 at 503 retrieves the #Customers by Country and Material:
CREATE VIEW L4 AS SELECT COUNTRY, MATERIAL, COUNT(DISTINCT CUSTOMER) "NO_CUSTOMERS" FROM L0 GROUP BY COUNTRY, MATERIAL Layer 5 at 504 retrieves the #Customers by Country:
CREATE VIEW L5 AS SELECT COUNTRY, COUNT(DISTINCT CUSTOMER) "NO_CUSTOMERS" FROM L0 GROUP BY COUNTRY Layer 6 at 505 retrieves the total of #customers:
CREATE VIEW L6 AS SELECT COUNTRY(DISTINCT CUSTOMER) "NO_CUSTOMERS" FROM L0

After definition of the layers, the needed data can be retrieved from the layers using SQL statements, such as a nested SQL statement corresponding to the above VIEWs. In one embodiment, additional SQL filters may be used as illustrated in the following SQL statement:
SELECT COUNTRY, SUM(QUANTITY) FROM L2 WHERE COUNTRY='US' GROUP BY COUNTRY.

As another example, conversions, such as currency conversion, can be expressed via a join to a relational table CC containing the following currency conversion information: base currency, the target currency, and optionally a keydate and the conversion rate.

A currency conversion that converts the data using daily conversion rates of the bookdate and sums up all amounts per customer is shown as follows:
CREATE VIEW $L_X$ AS SELECT $L_{X-1}$.CUSTOMER, CC.TARGET_CURRENCY AS CURRENCY, SUM (CC.CONVERSION_RATE*$L_{X-1}$.AMOUNT) FROM $L_{X-1}$ JOIN CC ON $L_{X-1}$.CURRENCY=CC.BASE_CURRENCY AND $L_{X-1}$.BOOKDATE=CC.KEYDATE GROUP BY $L_{X-1}$.CUSTOMER, CC.TARGET_CURRENCY Enhancing the Execution Model with Exception Aggregation Standard Aggregation and Exception Aggregation A multidimensional data model normally specifies a default aggregation for a measure. For example, measures expressing stock (i.e., inventory) values are normally aggregated using SUM, except over the time dimension.

Exception aggregation may be implemented as a metadata definition, for example that is attached to a measure. In contrast to the standard aggregation, exception aggregation defines a special aggregation that is applied by the analytic engine (i.e., the OLAP) when aggregating the measure over the specified exception aggregation reference dimension. The mentioned stock values are usually aggregated over time using AVERAGE or FIRST or LAST aggregation, for example.

Table 1 is reproduced again here to illustrate an alternative implementation using exception aggregation. Note that the #customers does not aggregate across both country and material nor across both countries. Accordingly, exception aggregation may be used as described below.

TABLE 1

| Country | Material | #Customers | Quantity |
|---|---|---|---|
| DE | 0001 | 5 | 10 |
|  | 0003 | 3 | 5 |
|  | Total | 6 | 15 |
| US | 0001 | 3 | 7 |
|  | 0002 | 5 | 11 |
|  | Total | 7 | 18 |
| Total |  | 11 | 33 |

A normal aggregation rule to achieve the expected results for Table may include:
1. Aggregate the data using standard aggregation up to the granularity that includes all requested dimensions and the exception aggregation reference dimension;
2. Aggregate the data further up to the granularity that includes all requested dimensions using the exception aggregation.

This can be achieved by marking the exception aggregation reference dimension in our execution model with a special "keep in groupby" attribute, which prevents the engine executing the model from removing this groupby column if it is not requested in the final query.

Using this technique, Table 1 can be expressed by a two layer graph model, where the highest layer (here L1) corresponds to a query comprising exception aggregation as shown in the example below:
CREATE VIEW L0 AS SELECT COUNTRY, MATERIAL, CUSTOMER, SUM(QUANTITY) "QUANTITY" FROM . . . .
GROUP BY COUNTRY, MATERIAL, CUSTOMER
CREATE VIEW L1 AS SELECT COUNTRY, MATERIAL, CUSTOMER ("KEEP IN GROUP_BY"), 1 "NO_CUSTOMERS", FROM L0 GROUP BY COUNTRY, MATERIAL, CUSTOMER In this example, the above queries correspond to a two layer model where a first node L1 on a highest tier in the model corresponds to the L1 view, which includes an exception aggregation ("KEEP IN GROUP_BY") for the dimension CUSTOMER. The exception aggregation allows CUSTOMER to be aggregated in different ways as illustrated below to obtain the results shown in Table 1. Node L0 is on a tier below the highest tier, which in this simple case corresponds to the L1 view.

All numbers in Table 1 can be retrieved by only selecting the data from these two layers. For instance, OLAP queries may be received and used to retrieve the desired information from the model as follows. The quantity column can be fetched from View L0 by the following 3 SQL statements:
A1: SELECT COUNTRY, MATERIAL, SUM(QUANTITY) FROM L0 GROUP BY COUNTRY, MATERIAL
A2: SELECT COUNTRY, SUM(QUANTITY) FROM L0 GROUP BY COUNTRY
A3: SELECT SUM(QUANTITY) FROM L0

The #customers can be fetched from View L1 by the following 3 SQL statements:
B1: SELECT COUNTRY, MATERIAL, SUM(NO_CUSTOMERS) FROM L1 GROUP BY COUNTRY, MATERIAL
B2: SELECT COUNTRY, SUM(NO_CUSTOMERS) FROM L1 GROUP BY COUNTRY
B3: SELECT SUM(NO_CUSTOMERS) FROM L1

The SQL statements against View L1 are processed by the engine interpreting the "keep in groupby" attribute. All other unnecessary groupbys are generically removed by the engine. The resulting executed SQL is the following:
B1: SELECT COUNTRY, MATERIAL, SUM(NO_CUSTOMERS)
FROM (
SELECT COUNTRY, MATERIAL, CUSTOMER, 1 "NO_CUSTOMERS" FROM L0 GROUP BY COUNTRY, MATERIAL, CUSTOMER)
GROUP BY COUNTRY, MATERIAL For example, to process B1 in the inner SQL, no groupbys are removed, because COUNTRY and MATERIAL are requested in the outermost select statement, and customer is needed as an exception aggregation reference dimension. The above example illustrates that the second query comprises at least one SQL statement corresponding to the L0 node of the model on the tier below the highest tier (e.g., the L1 tier) that is nested in a SQL statement corresponding to the first query (e.g., B1: SELECT COUNTRY, MATERIAL, SUM(NO_CUSTOMERS) FROM L1 GROUP BY COUNTRY, MATERIAL). The following nested queries are similar for B2 and B3:
B2: SELECT COUNTRY, SUM(NO_CUSTOMERS)
FROM (
SELECT COUNTRY, CUSTOMER, 1 "NO_CUSTOMERS" FROM L0 GROUP BY COUNTRY, CUSTOMER)
GROUP BY COUNTRY To process B2 in the inner SQL, the groupby MATERIAL is removed, as it is not requested in the outermost select statement, and not needed as exception aggregation reference dimension.
B3: SELECT SUM(NO_CUSTOMERS)
FROM (
SELECT CUSTOMER, 1 "NO_CUSTOMERS" FROM L0 GROUP BY CUSTOMER)

To process B3 in the inner SQL the groupby MATERIAL and COUNTRY are removed, as they are not requested in the outermost select statement, and not needed as exception aggregation reference dimension.

As another example, population may be calculated with standard aggregation SUM and exception aggregation MAX over dimension year. In this example L0 is as follows:
CREATE VIEW L0 AS SELECT COUNTRY, STATE, YEAR (KEEP IN GROUPBY), SUM(POPULATION) "POPULATION" FROM . . . .
GROUP BY COUNTRY, STATE, YEAR In order to get the population of all countries the following query may be run against the above single layer model:
SELECT COUNTRY, MAX(POPULATION) FROM L0
The above query is processed as follows:
SELECT COUNTRY, MAX(POPULATION) FROM (
SELECT COUNTRY, YEAR, SUM(POPULATION) "POPULATION" FROM . . . .
GROUP BY COUNTRY, YEAR)
group by country Outside the analytic engine, population appears as having max aggregation, but it only has max aggregation over time, over all other dimensions sum aggregation is executed.

Example Hardware

Figure 6:
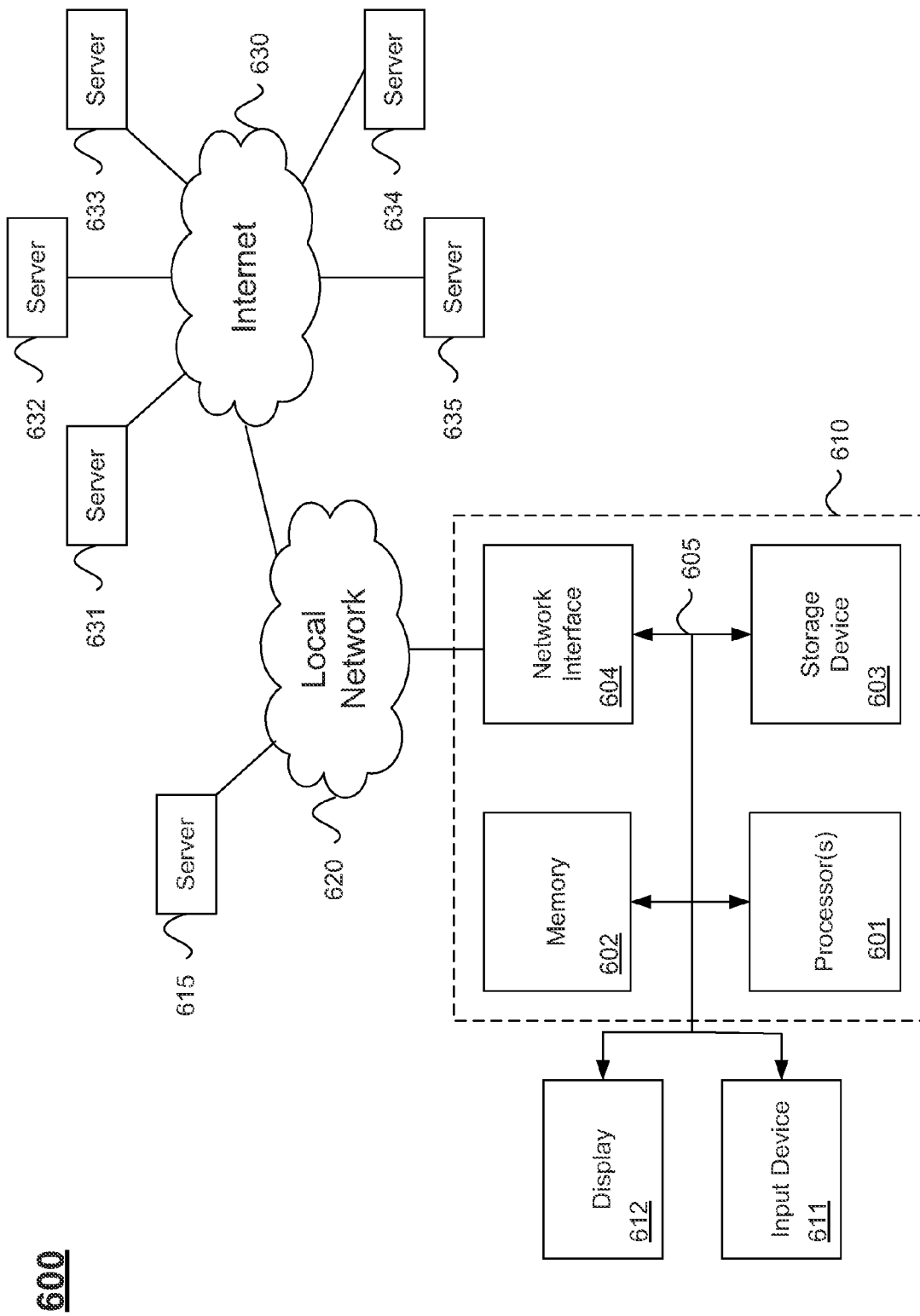
FIG. 6 illustrates hardware of a special purpose computing machine configured with a process according to one embodiment of the present invention.

FIG. 6 illustrates hardware of a special purpose computing machine configured with a process according to one embodiment of the present invention. The following hardware description is merely one example. It is to be understood that a variety of computers topologies may be used to implement the above described techniques. An example computer system 610 is illustrated in FIG. 6, which shows components of a single computer. Computer system 610 includes a bus 605 or other communication mechanism for communicating information, and one or more processor(s) 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of non-transitory computer readable storage mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) interface to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information through the network interface 604 across a local network 620, an Intranet, or the Internet 630. For a local network, computer system 610 may communicate with a plurality of other computers, such as server 615. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
receiving a first query in an online analytic processor (OLAP) executing on one or more computers;
generating a model, the model specifying a graph defining a plurality of nodes and a plurality of tiers, each node corresponding to a different operation on data;
generating a second query based on the model, the second query including a plurality of layered subqueries each corresponding to one of the nodes in the graph for specifying the different operations on the data;
receiving the second query in a relational engine coupled to a datastore, wherein the relational engine executes the second query, and in accordance therewith, retrieves data,
wherein the plurality of nodes includes a root node on a first tier, a plurality of second tier nodes on a second tier, and one or more higher tier nodes on a plurality of tiers above the first tier and the second tier, wherein the root node has a corresponding first subquery to operate on raw data in the database to retrieve first data, wherein the first data comprises all the data required to answer the first query,
wherein the plurality of second tier nodes are coupled to the root node in the graph and each have corresponding subqueries that perform different operations on the first data,
wherein at least one of the second tier nodes is coupled to the one or more higher tier nodes, wherein each higher tier node has a corresponding subquery for operating on data generated by the subquery of the at least one second tier node; and
generating an answer to the first query by operating the plurality of layered subqueries on the first data only, according to the graph.

2. The method of claim 1 wherein a first node on a highest tier in the model corresponds to a subquery comprising an exception aggregation, the exception aggregation associating a first aggregation type with a first measure and a first dimension of a dimension table, the first aggregation type being different than a default aggregation type used on the first measure when aggregating said first measure across other dimensions, wherein the second query comprises at least one SQL statement corresponding to a second node on a tier below the highest tier nested in a SQL statement corresponding to the first query.

3. The method of claim 1 wherein the OLAP generates and comprises said model, and wherein the second query is generated by said OLAP.

4. The method of claim 1 wherein the plurality of nodes correspond to successive operations on the data in the datastore performed by the relational engine.

5. The method of claim 1 wherein the datastore is a database, and wherein the data is stored in the database in at least one fact table and a plurality of dimension tables.

6. The method of claim 1 wherein the second query is a nested SQL statement.

7. The method of claim 1 wherein each subquery is a database view containing a SQL statement.

8. The method of claim 1 wherein the graph specifies an execution plan where operations corresponding to lower tier nodes are performed on data before operations corresponding to higher tier nodes and wherein data resulting from an operation corresponding to a first node on a lower tier is operated on by a second higher tier node directly connected to the first node in the graph.

9. A system comprising:
one or more computers;
a database;
an online analytic processor (OLAP), executing on the one or more computers, to receive a first query;
a model, the model specifying a graph defining a plurality of nodes on a plurality of tiers, each node corresponding to a different operation on data, wherein the OLAP generates a second query based on the model, the second query including a plurality of layered subqueries each corresponding to one of the nodes in the graph for specifying the different operations on data; and a relational engine coupled to a datastore to receive the second query, wherein the relational engine executes the second query, and in accordance therewith, retrieves data, wherein the plurality of nodes includes a root node on a first tier, a plurality of second tier nodes on a second tier, and one or more higher tier nodes on a plurality of tiers above the first tier and the second tier, wherein the root node has a corresponding first subquery to operate on raw data in the database to retrieve first data, wherein the first data comprises all the data required to answer the first query, wherein the plurality of second tier nodes are coupled to the root node in the graph and each have corresponding subqueries that perform different operations on the first data, wherein at least one of the second tier nodes is coupled to the one or more higher tier nodes, wherein each higher tier node has a corresponding subquery for operating on data generated by the subquery of the at least one second tier node;

wherein the OLAP generates an answer to the first query by operating the plurality of layered subqueries on the first data only, according to the graph.

10. The system of claim 9 wherein the plurality of nodes correspond to successive operations on the data in the datastore performed by the relational engine.

11. The system of claim 9 wherein the datastore is a database, and wherein the data is stored in the database in at least one fact table and a plurality of dimension tables.

12. The system of claim 9 wherein the second query is a nested SQL statement.

13. The system of claim 9 wherein each subquery is a database view containing a SQL statement.

14. A non-transitory computer readable storage medium embodying a computer program for performing a method, said method comprising:

receiving a first query in an online analytic processor (OLAP) executing on one or more computers;

generating a model, the model specifying a graph defining a plurality of nodes and a plurality of tiers, each node corresponding to a different operation on data;

generating a second query based on the model, the second query including a plurality of layered subqueries each corresponding to one of the nodes in the graph for specifying the different operations on the data;

receiving the second query in a relational engine coupled to a datastore, wherein the relational engine executes the second query, and in accordance therewith, retrieves data, wherein the plurality of nodes includes a root node on a first tier, a plurality of second tier nodes on a second tier, and one or more higher tier nodes on a plurality of tiers above the first tier and the second tier, wherein the root node has a corresponding first subquery to operate on raw data in the database to retrieve first data, wherein the first data comprises all the data required to answer the first query, wherein the plurality of second tier nodes are coupled to the root node in the graph and each have corresponding subqueries that perform different operations on the first data, and wherein at least one of the second tier nodes is coupled to the one or more higher tier nodes, wherein each higher tier node has a corresponding subquery for operating on data generated by the subquery of the at least one second tier node;

generating an answer to the first query by operating the plurality of layered subqueries on the first data only, according to the graph.

* * * * *